(12) United States Patent
Du Toit et al.

(10) Patent No.: US 10,605,910 B2
(45) Date of Patent: Mar. 31, 2020

(54) GOLF BALL TRACKING SYSTEM

(71) Applicant: ALPHAWAVE GOLF (PTY) LTD, Stellenbosch (ZA)

(72) Inventors: Leendert Johannes Du Toit, Stellenbosch (ZA); Sarel Jacobus Marais, Stellenbosch (ZA)

(73) Assignee: ALPHAWAVE GOLF (PTY) LTD, Stellenbosch (ZA)

( * ) Notice: Subject to any disclaimer, the term of this patent is extended or adjusted under 35 U.S.C. 154(b) by 193 days.

(21) Appl. No.: 15/541,522

(22) PCT Filed: Dec. 3, 2015

(86) PCT No.: PCT/IB2015/059308
§ 371 (c)(1),
(2) Date: Jul. 5, 2017

(87) PCT Pub. No.: WO2016/110757
PCT Pub. Date: Jul. 14, 2016

(65) Prior Publication Data
US 2018/0011184 A1    Jan. 11, 2018

(30) Foreign Application Priority Data
Jan. 6, 2015   (ZA) ................................ 2015/00061

(51) Int. Cl.
*G01S 13/87* (2006.01)
*G01S 13/58* (2006.01)
(Continued)

(52) U.S. Cl.
CPC ............ *G01S 13/876* (2013.01); *G01S 7/003* (2013.01); *G01S 13/34* (2013.01); *G01S 13/584* (2013.01);
(Continued)

(58) Field of Classification Search
CPC ........ A63B 24/0021; A63B 2024/0028; A63B 2024/0031; A63B 2024/0034; A63B 69/3658; G01S 13/878
(Continued)

(56) References Cited

U.S. PATENT DOCUMENTS

| | | | | |
|---|---|---|---|---|
| 2,939,134 A | * | 5/1960 | Van Atta | G01S 1/02 342/143 |
| 4,673,183 A | * | 6/1987 | Trahan | A63B 24/0021 342/28 |

(Continued)

FOREIGN PATENT DOCUMENTS

| | | |
|---|---|---|
| CN | 1981207 A | 6/2007 |
| CN | 102341149 A | 2/2012 |

(Continued)

OTHER PUBLICATIONS

"Component-based software engineering," from Wikipedia, accessed on Apr. 2, 2019. (Year: 2019).*

(Continued)

*Primary Examiner* — Bernarr E Gregory
(74) *Attorney, Agent, or Firm* — Scully, Scott, Murphy & Presser, P.C.

(57) ABSTRACT

The invention discloses a golf ball tracking system, which includes a distributed sensor and processor system adapted to simultaneously track the trajectories of multiple golf balls hit by one of more golfers. The system is adapted to keep track of the location of the golfers to enable the allocation of shots to the correct golfer. The system is operated at a golf driving range, where multiple players can hit balls from anywhere within a designated area and/or fixed hitting bay locations. Multilateration is used to determine the location of multiple targets in 3D space, based on the reported range and Doppler from distributed radar sensors.

32 Claims, 2 Drawing Sheets

(51) Int. Cl.
  *G01S 13/88* (2006.01)
  *G01S 13/72* (2006.01)
  *G01S 7/00* (2006.01)
  *G01S 13/34* (2006.01)
  *G01S 19/19* (2010.01)
  *G01S 13/46* (2006.01)

(52) U.S. Cl.
  CPC .......... *G01S 13/726* (2013.01); *G01S 13/878* (2013.01); *G01S 13/88* (2013.01); *G01S 19/19* (2013.01); *G01S 2013/466* (2013.01)

(58) Field of Classification Search
  USPC .......................................................... 342/59
  See application file for complete search history.

(56) References Cited

U.S. PATENT DOCUMENTS

| | | | | |
|---|---|---|---|---|
| 4,751,511 | A * | 6/1988 | Komata | G01S 13/87 342/424 |
| 5,138,322 | A * | 8/1992 | Nuttall | G01S 13/87 342/126 |
| 5,481,355 | A * | 1/1996 | Iijima | A63B 24/0021 250/222.1 |
| 7,095,312 | B2 * | 8/2006 | Erario | A63B 24/0021 340/323 R |
| 7,321,330 | B2 * | 1/2008 | Sajima | A63B 24/0021 342/118 |
| 8,113,964 | B2 * | 2/2012 | Lindsay | A63B 24/0021 473/150 |
| 8,836,574 | B2 | 9/2014 | Grau Besoli et al. | |
| 9,339,715 | B2 * | 5/2016 | Luciano, Jr. | G01S 13/878 |
| 9,555,284 | B2 * | 1/2017 | Vollbrecht | A63B 24/0021 |
| 10,238,943 | B2 * | 3/2019 | Vollbrecht | A63B 24/0021 |
| 2004/0032363 | A1 | 2/2004 | Schantz et al. | |
| 2007/0075891 | A1 * | 4/2007 | Sajima | A63B 24/0021 342/59 |
| 2008/0021651 | A1 * | 1/2008 | Seeley | A63B 24/0021 702/3 |
| 2011/0250939 | A1 | 10/2011 | Hobler | |
| 2011/0304497 | A1 | 12/2011 | Molyneux et al. | |
| 2013/0162467 | A1 | 6/2013 | Winther | |
| 2013/0274025 | A1 | 10/2013 | Luciano, Jr. et al. | |
| 2014/0347212 | A1 | 11/2014 | Tuxen | |

FOREIGN PATENT DOCUMENTS

| | | | | |
|---|---|---|---|---|
| EP | 2233932 | A1 * | 9/2010 | ......... A63B 69/3658 |
| JP | H08-266701 | A | 10/1996 | |
| WO | 01/01168 | A2 | 1/2001 | |
| WO | 2005/035076 | A2 | 4/2005 | |
| WO | 2013/036727 | A2 | 3/2013 | |

OTHER PUBLICATIONS

International Search Report dated Jan. 29, 2016 issued in PCT/IB2015/059308.
Extend European search report dated Sep. 13, 2018 received from the European Patent Office in EP Applicatio No. 15876744.2.
Official Action dated Nov. 5, 2018 received from the Chinese Patent Office in related application CN 201580072641.0.
Official Action dated May 7, 2019 received from the Japanese Patent Office in related application JP 2017-553468.

* cited by examiner

GOLF BALL TRACKING SYSTEM

FIELD OF INVENTION

The present invention relates to a golf ball tracking system.

More particularly, the present invention relates to a golf ball tracking system for determining the simultaneous trajectories of golf balls hit by multiple golfers at the same location.

BACKGROUND TO INVENTION

Golf is a popular sport worldwide being enjoyed by millions of golfers. A huge amount of money is spent on training and developing golfers. The training methods utilise various technical training equipment adapted to assist a golfer to improve his game. The known technical training equipment have various drawbacks and limitations.

It is an object of the invention to suggest a golf ball tracking system, which will assist in overcoming these problems and open up new possibilities in training and interactive gaming.

SUMMARY OF INVENTION

According to the invention, a golf ball tracking system includes a distributed sensor and processor system adapted to simultaneously track the trajectories of multiple golf balls hit by one of more golfers.

Also according to the invention, a method for tracking a golf ball, includes the step of simultaneously tracking the trajectories of multiple golf balls hit by one of more golfers by means of a distributed sensor and processor system.

To enable the allocation of shots to the correct golfer, the system may also be adapted to keep track of the location of the golfers.

The system may be operated at a golf driving range, where multiple players can hit balls from anywhere within a designated area and/or fixed hitting bay locations.

The system may also be adapted to locate the position of dedicated targets placed within the coverage area.

This may enable reporting of how far from a specified target each shot finished, and also serve as a reference for the golfer to indicate his intended aim direction.

Frequency-modulated constant wave (FMCW) radar technology may be used to track balls in flight.

Multilateration may be used to determine the location of multiple targets in 3D space, based on the reported range and Doppler from distributed radar sensors.

Dedicated ID tags, in conjunction with radar or a global navigation satellite system (GNSS), may be used to determine the locations of the golfers, and perhaps also the targets.

By logging on to the system (via an internet connection and/or a local wireless network), the user may be able to view detailed information of every shot on his mobile device, immediately after the shot is hit.

The system may include a mobile application which is adapted to include games and training aids to facilitate competition against other golfers or oneself, and help improve one's game.

The system may also serve as a tool for coaches to manage their students' training programmes and track improvement.

The user's practice session data may be uploaded to cloud-based storage from where the data can be accessed via a desktop or mobile application for subsequent viewing and analysis.

BRIEF DESCRIPTION OF DRAWINGS

The invention will now be described by way of example with reference to the accompanying schematic drawings.

In the drawings there is shown in.

DETAILED DESCRIPTION OF DRAWINGS

The golf ball tracking system, according to the invention, includes a distributed sensor and processor system adapted to simultaneously track the trajectories of multiple golf balls hit by one of more golfers.

To enable the allocation of shots to the correct golfer, the system is also adapted to keep track of the location of the golfers.

The system is operated at a golf driving range, where multiple players can hit balls from anywhere within a designated area.

The system is adapted to locate the position of dedicated targets placed within the coverage area. Alternatively, fixed target locations can be determined during installation when an accurate survey of the range is performed.

This enables reporting of how far from a specified target each shot finished, and also serve as a reference for the golfer to indicate his intended aim direction.

Frequency-modulated constant wave (FMCW) radar technology is used to track balls in flight.

Dedicated ID tags (in conjunction with radar or GNSS) is used to determine the locations of the golfers, and perhaps also the targets.

By logging on to the system, the user is able to view detailed information of every shot on his mobile device, immediately after the shot is hit.

The system includes a mobile application which is adapted to include games and training aids to facilitate competition against other golfers or oneself, and help improve the player's game.

The system also serves as a tool for coaches to manage their players' training programmes and track improvement.

The user's practice session data is uploaded to cloud-based storage from where the data can be accessed via a desktop or mobile application for subsequent viewing and analysis.

Figure 1:
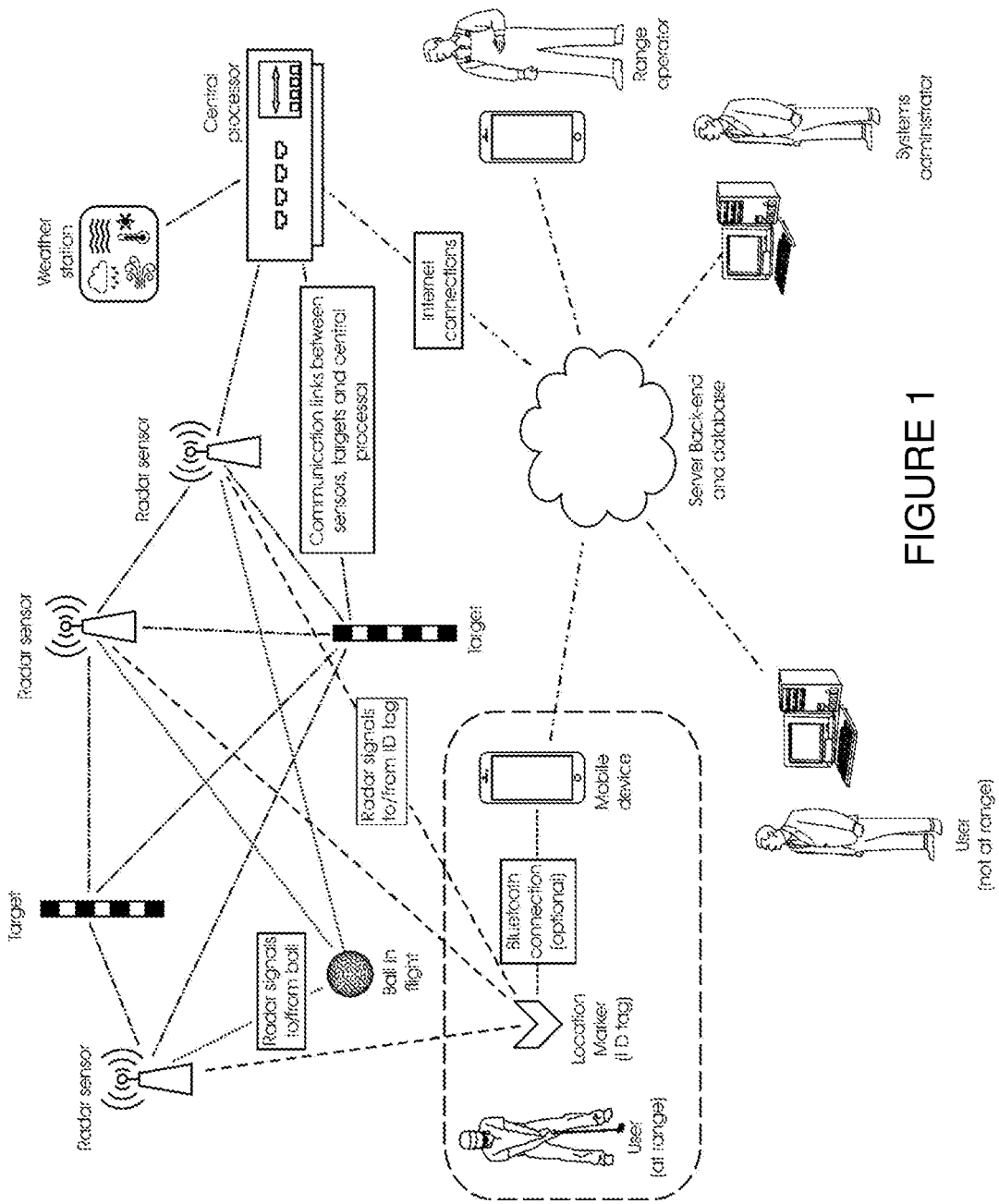
FIG. 1: a high-level diagram of the golf ball tracking system according to the invention.

FIG. 1 shows a high-level diagram with the different components of the golf ball tracking system. Note that the number of sensors, tags, users, targets and balls in flight is not representative of what can be present in the actual system, but was selected for clarity of illustration.

Figure 2:
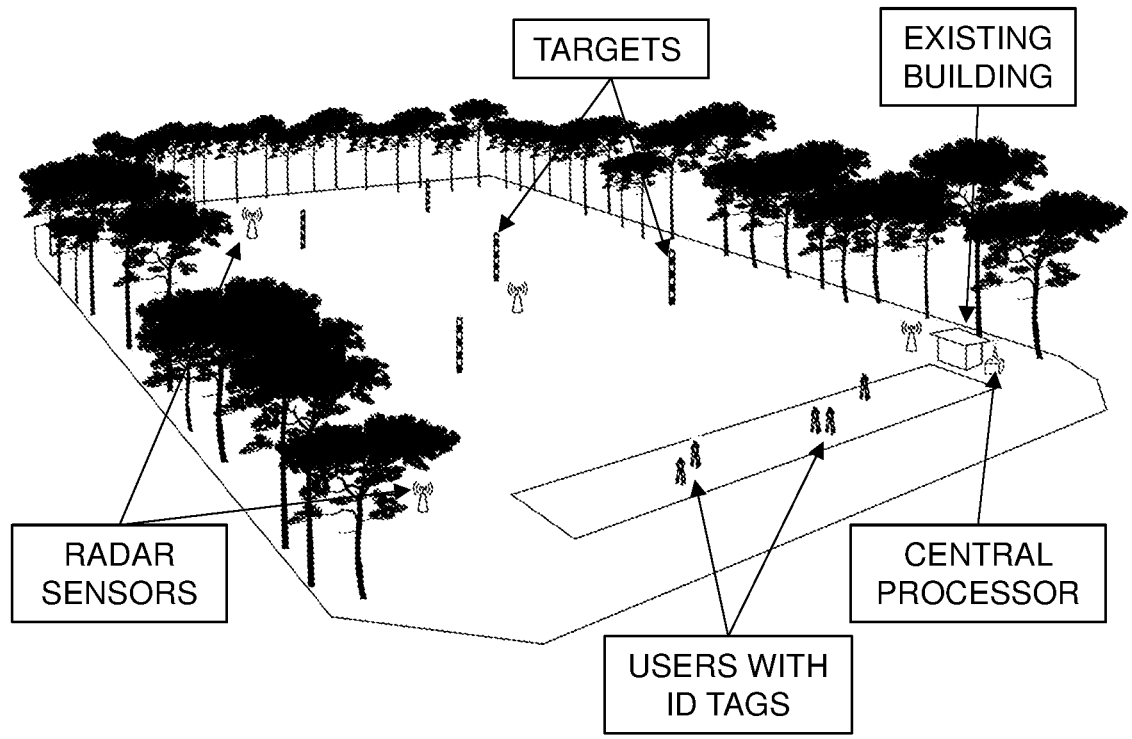
FIG. 2: a graphical illustration of the golf ball tracking system according to the invention as installed at a typical practice facility.
Figure 2:
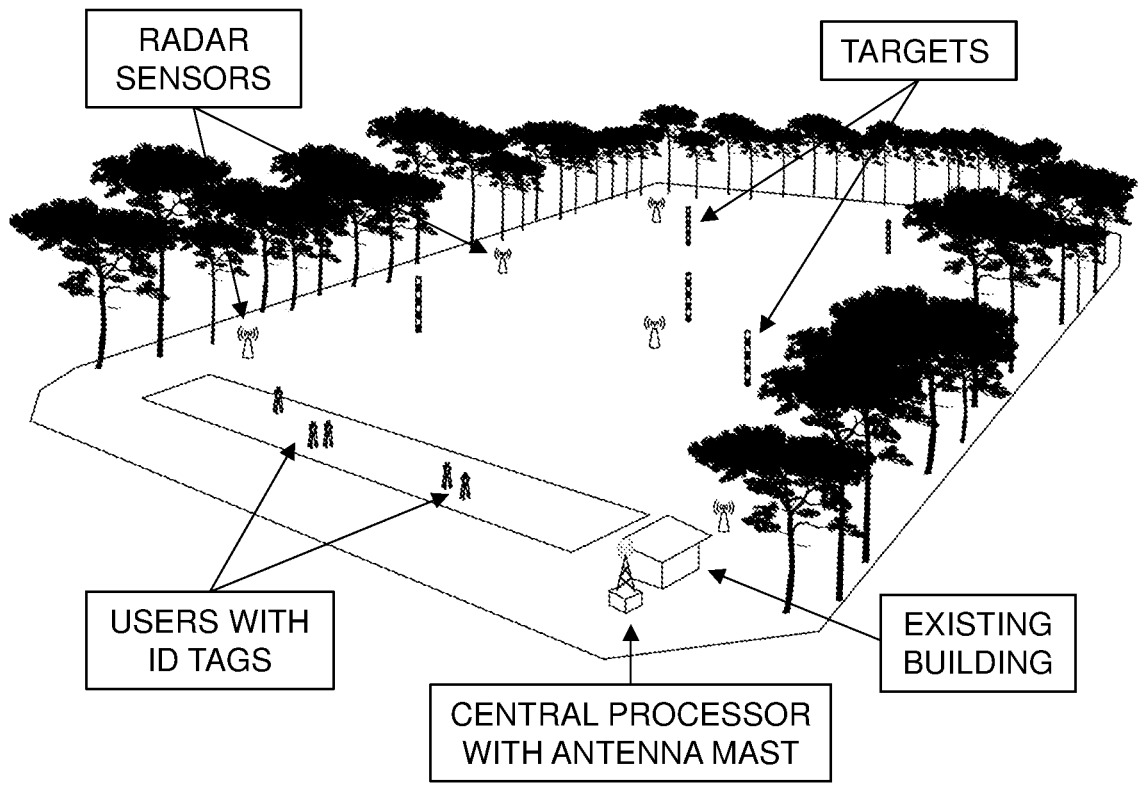

FIG. 2 provides a graphical illustration of the golf ball tracking system as it can be installed and used at a typical practice facility. The individual components are not to scale and have been increased in size to make them clearly visible. Also note that the exact design and form factor of the individual components can vary.

(a) System Functions
Establish Communication Links Between the Sensors and the Central Processor The central processor uses data from all the sensors to calculate speed and location of balls in flight, as well as the location of the users (golfers) and the targets. To that end, communication links are required between the sensors and the central processor. Measured data is sent from the sensors to the central processor, while commands required for coordination of the system is sent from the processor to the sensors.

Determine the Relative Position of all Sensors

To enable calculation of the relative three-dimensional position in space from range data from multiple sensors, it is necessary to know the location of the sensors within acceptable accuracy. The exact method of obtaining this position data is still to be determined. Potential solutions include GNSS or multilateration of multiple radar signals. Alternatively, the sensor locations can be measured accurately during installation when the range is surveyed.

Determine the Relative Position of all Users

To enable the system to assign calculated ball flight trajectories to the correct users, it needs to know the location of the user when the ball was launched. In one possible implementation, radar can be used to measure the distances between a modulating tag and several of the sensors. The central processor then uses multilateration techniques to determine the location of the user, similar to what is used to calculate the position of a ball in flight. A unique modulating code can be used for each active tag to enable identification of users. An alternative implementation uses accurate relative GNSS to determine the location of a location marker. This location marker can either be worn by the user, or placed next the location where he is hitting from.

Determine the Relative Position of all the Targets Sensors.

The location of targets equipped with modulating tags can either be determined using the same principles as for the tags worn by the users, or with other means (such as GNSS). These target locations can appear on the mobile application, and can be used for a variety of functions such as reporting how far a shot finished from the intended target, or allowing the user to specify the intended aim direction.

Measure Instantaneous Range and Doppler Velocity of Balls in Flight

The sensors uses FMCW radar to determine the distance (range) between the sensor and a ball in flight, as well as the relative radial speed (Doppler) between the ball and the sensor. This is reported to the central processor for calculation of ball flight trajectories.

Construct Individual Flight Trajectories from Measured Data

Range and speed data from all sensors can be combined by the central processor to construct complete 3D flight trajectories using multilateration and tracking techniques. These calculations can be performed concurrently for all balls in flight.

Assign Individual Ball Flights to the Correct User

When a complete ball flight trajectory has been calculated, its origin can be determined. By knowing the location of all the users, each ball flight can be assigned to the user who hit the shot.

Measure the Spin Rate of the Balls in Flight

By measuring the modulation of the Doppler signal measured by the radar sensors, it can be possible to extract the spin rate of a ball in flight.

Calculate the Spin Axis

By making certain assumptions regarding atmospheric conditions, the ball's spin axis can be calculated from the flight trajectory and launch conditions (vertical and horizontal launch angle, launch speed and launch spin rate).

Transmit Ball Flight Data to the User's Mobile Device

As the flight trajectory is calculated from the sensor data, the system can distribute it to the applicable user's mobile device via an internet connection. The mobile application can then use this data to perform various functions.

Accept and Process Input from the User

The user is able to provide input to the system with his mobile device. Potential input includes selecting a target and indicating an intended aim direction. This input can be used by the mobile application, and also by the system (e.g. for cloud-based storage of flight trajectory data relative to an intended aim line).

Provide Feedback of Ball Flight Data

The mobile application provides immediate feedback of ball flight data after the shot is completed. This can be configured as only visually on the device's display, or via an audible read-out over the device's speaker.

Provide Games and Training Aids to the User

The mobile application can include several games, competitions and training aids to enhance the practice experience and to help gauge and improve the user's skill level.

Measure and Log Weather and Atmospheric Conditions

A weather station can be included to measure and log parameters such as wind strength, wind direction, air temperature, humidity, barometric pressure, precipitation etc. This can then be logged with the user's ball flight data for that particular practice session to enable him to form an understanding of exactly how different weather conditions affect his game.

Provide Guidelines and Feedback During System Installation

The system is able to guide the installer during the installation process to ensure that optimal sensor positioning is achieved. This is made possible by designing the sensors to report their relative location and orientation to the central processor. Proper sensor placement ensures that the system does not have any blind spots, while at the same time minimising the total number of sensors required.

Perform Ongoing Self-Diagnostic Tests

Each sensor can measure its own low-level operational parameters (e.g. voltage, current, temperature, battery charge, etc.) and report it to the central processor. By performing post-processing on data from all sensors, the system is also able to detect if any sensor is either reporting false targets or missing targets that it should be reporting.

Upload Ball Flight Data to Cloud-Based Storage

All calculated ball flight data is linked to a specific user's account and uploaded to cloud-based storage via an internet connection.

Provide Remote Access Via an Internet Connection

This allows the supplier and/or system administrator to connect remotely to the system to obtain statistical usage data and monitor the operation of the system (b) Hardware Description This section provides more information on the specific technologies and implementations used for various system hardware components illustrated in FIG. 1.

Radar Sensors

At the lowest level, all range and speed measurements are performed by the radar sensors which are distributed over the area that needs to be covered. An FMCW-based radar measures the instantaneous distance (range) to every ball in flight (that is within range of that particular sensor), the targets as well as the ID tags worn by the users. If required to accurately determine the relative position of the sensors, they can also measure the distance between themselves and the other sensors. Each unit is equipped with a GNSS receiver to obtain an accurate time reference, and to help determine the relative position of all the sensors in the system.

The sensors can perform some real-time signal processing on the raw measured data as a first-pass filtering of actual target returns from noise and clutter, and to assign indexes to particular target returns based on the continuity of range and speed data from one sample to the next. This processed data is time-stamped and sent to the central processor for further processing. Alternatively, the raw measured data can be sent to the central processor where all radar signal processing can then take place.

Several options can be considered for powering the sensors:

1. If a wired connection is installed between the sensors and the central processor, the sensor can be powered directly from the central processor.
2. If the sensor is battery-powered, the following options exist:
a. The entire sensor is removed from the range at the end of the day, and connected to a charger over-night (similar to electric golf carts). As part of the range set-up routine before opening the next morning, all sensors need to be returned to their installed locations.
b. The sensor has a removable battery pack that can be exchanged every morning, or when the system indicates it is required.
c. Each sensor has its own solar cells used to recharge the battery.

The design and installation of the sensors is such that it is able to withstand direct hits from golf balls without being damaged.

Communication between the radar sensors and the central processor is implemented via a wireless network, with conductive cables, or with fibre optic cables.

Central Processor

The central processor is a computing device responsible for calculating ball flight trajectories and management of the hardware installation at the driving range. This unit can be housed within an existing building at the practice facility, or be integrated within its own outdoor weather-proof enclosure. It is supplied with AC mains power and an internet connection. A separate antenna mast provides an elevated position for an optional Wi-Fi antenna, antenna for communication with the sensors, as well as an antenna to provide an internet connection via a mobile network. If a weather station is implemented, it can also be located on this mast.

Golfer ID Tags or Location Markers

The user wears a unique ID tag that is activated for use before each session. The tag modulates and reflect the radar signals in such a way that the radar sensors are able to measure the distance to the tag, while determining the ID of the tag at the same time. The tag can also be implemented as a location marker that the user erects in the turf at the location where he is hitting from. It is also possible to use GNSS to determine the location of the user.

Targets

The method of determining the location of targets is similar to what is implemented for the user location markers.

The target and sensor can also be integrated into a single unit that serves both functions.

Mobile Interface Devices

The user is able to use a smart phone or tablets to connect to the system.

Computing Devices for Offline Data Analysis

Any personal computer or mobile device with an internet connection able to run the desktop or mobile application can be used to access the data stored in the user's account.

Weather Station

A weather station to measure atmospheric conditions such as wind strength, wind direction, air temperature, humidity, barometric pressure, precipitation etc. can be provided. Communication with the central processor with utilise the same protocol as used for the radar sensors.

(c) Software Description

This section describes the features of the different software applications that forms part of the system, which serves as the user interface for golfers, coaches and operators.

Reported Ball Flight Data

The following ball flight data is made available to the user via the various software applications described in the paragraphs that follow:

1. Carry distance
2. Lateral deviation from target line
3. Distance from target
4. Landing angle
5. Estimated roll
6. Total distance
7. Apex height
8. Total time of flight
9. 3D flight trajectory
10. Ball speed at launch
11. Vertical launch angle
12. Launch direction
13. Spin rate at launch
14. Spin axis Mobile Application for Golfers While at the practice facility, the golfer interacts with the system via a mobile application running on a smartphone or tablet.

a) Basic Operation

In basic operation mode, the golfer is able to see the trajectory of each shot as well as receive an accurate indication of landing position (total carry and lateral deviation). He also has the option of having the application read out selected data parameters for each shot over the mobile device's speaker, e.g.: "Carry distance: 173 m, Height: 33 m, Shape: 3 m draw".

The app is also able to show the distance from the golfer's current location to each target on the range.

b) Games and Training Aids

Several games and training aids are available to the golfer to make his practice sessions more effective and enjoyable, help him improve, and track his progress in various aspects of his game. A few of the training aids that are currently foreseen are summarised in the paragraphs that follow. The details provided here for the app are just illustrative examples:

Standardisation Test

This is a quick test/routine that the player can perform every day he goes to the range. He can hit a number of shots with clubs of his choice that the system can then record. Over time, he is able to learn exactly what his distance averages are with his clubs, and also how much it deviates from this average on any given day.

Knowledge of these numbers is useful to the golfer since many factors influence his shot distances and trajectory on any given day (player's physical condition, wind, temperature, altitude, humidity etc.). Receiving regular and consistent feedback allows the golfer to keep track of how his game changes under various conditions. Beyond the MVP, a weather station to log atmospheric conditions with the ball flight data can also be provided.

Distance Control with Wedges

A single shot is hit at several different target distances: 40 m, 50 m, 60 m, 70 m, 80 m, 90 m and 100 m. Landing the ball within a meter of the intended target distance earns 10 points, decreasing by a single point for every additional meter further away from the target distance. Zero points are scored for a ball landing further than 10 meters from the target distance. A perfect score would thus be 70 points.

Distance Control with Irons

This is similar to the distance control with wedges, but with increasing distances covering the distance range of short irons all the way through the long irons and hybrids.

Driver Distance

Attempt to maximise driver distance while keeping the ball within an allotted sector.

Trajectory Control

This game challenges the player to see how accurately he can adjust the trajectory height of his shots while still achieving accurate distance control. This improves the player's ability to control his shots in windy conditions.

Shaping Shots

The player is challenged to hit 9 different shot shapes and still land the ball within a specified distance of the target, making it progressively more challenging as the players skill level improves.

60 Shot Challenge

An all-round test of the player's game by hitting 3 shots at 20 different distances.

Play the Course

A virtual round of golf can be played from tee to green, with tee shots and approach shots based on actual distances that would have been required on the specific course being played.

c) Rankings

There is an online ranking system for each of the tests and challenges. The player can compare his skill level to golfers worldwide, within his country or state, club, personal group etc.

If this system is installed at practice and warm-up facilities at the major professional golf tour events, a player at De Zalze in Stellenbosch can, for example, look at the world rankings for the "Distance control with wedges" challenge in his app and see that the best score ever recorded was 62 by Tiger Woods. That way he can be motivated to have a go at beating the scores of the biggest names in golf.

Application for Coaches and Team Managers

As the functionality required by coaches and team managers differs from that required by the golfer, it is listed here as a separate application. It is possible, however, that it is implemented only as a separate function of the same application.

The application aimed at coaches allows them to customise a group/team's practice routines, and keep track of progress by following them online. It is difficult to measure a players' improvement, since only looking at their scores for a round is often misleading and doesn't provide clear information as to how they are performing in various aspects of the game. The results of the tests and challenges provides a much better overall picture.

This feature is especially valuable for college coaches as they are constantly trying to figure out exactly how their players are improving and what their strengths and weakness are. Knowing this allows them to plan and construct an appropriate training programme for each individual. A coach has the ability to specify entire training sessions for all his players that they can follow on their mobile devices. He then gets feedback after the practice session and can analyse the performance of the players on that day and also keep track of progress over time.

Desktop/Web Application

A desktop or web-based application enables more detailed analyses of practice session data than what is possible with the mobile application. The player is able to view historic data in various formats (charts, graphs etc.) to keep track of progress in the various aspects of his game.

System Management Application

A management application is made available to the operator of the driving range facility. Some of the functions of this application are outlined below.

a) General System Control

This includes basic operations such as switching on/off of the entire system, managing wireless network properties etc.

b) Coverage Monitor

The coverage area of the system with its current sensor configuration can be made visible. This allows reconfiguration of the range setup while still maintaining coverage.

c) Health Monitoring of the Various System Components

The operator is able to see which (if any) of the system components are not operating as expected and potentially need to be replaced. This can also be used to schedule preventative maintenance (e.g. replacement of radar sensor batteries, or cleaning of solar panels).

d) Management of Active Users

All active user tags and associated user accounts can be viewed and managed from this application.

Data Export

It is considered to make the 3D ball flight data available in an exportable format for 3rd party applications. This can be useful to coaches, club-fitters, equipment manufacturers, golf simulators and virtual golf games, as well as TV productions.

Use Case Scenario

A typical use case scenarios is outlined below as a sequence of steps:

1. The mobile application is downloaded from the applicable on-line store for the user's mobile device.
2. Upon arrival at the practice facility, the user receives an ID tag or location marker from the driving range operator. Each user receives his own personal tag or location marker that only needs to be registered on the system upon arrival at the driving range.
3. The user logs in to his unique account.
4. When activated, each tag or location marker has a unique ID, and this is then linked to the user's mobile device and account. This can be done via a Bluetooth or near field wireless connection, or by simply entering the tag's number in the mobile application.
5. After the tag is linked to the user's account, every shot hit by the user is measured and displayed on the mobile app.
6. The user can select a specific target to aim at, or indicate an aim direction on the mobile app interface that serves as a reference for the calculated launch direction.
7. If desired, the user can select from a variety of training aids or games provided by the app.
8. The user can also follow a personalised practice session created by his coach.
9. After the practice session, the user's tag is de-activated from the user's account and returned to the driving range operator.

10. The user has online access to all recorded ball flight data and game/training aid results. This can be used for subsequent analyses and progress tracking.

The invention claimed is:

1. A golf ball tracking system comprising a distributed radar sensor system including a plurality of radar sensors distributed over a coverage area and a processor comprising hardware in communication via a communication link with the radar sensors, the plurality of radar sensors configured to measure data of
multiple golf balls simultaneously moving through the coverage area,
the processor or the plurality of radar sensors configured to track flights of the multiple golf balls by associating subsequent measurements from particular balls in flight based on continuity of data from one sample to a next sample,
the processor configured to:
concurrently construct complete trajectories for each of the multiple golf balls in flight;
determine their geographical origins and landing locations; and
assign each of the multiple golf ball trajectories to one of one or more golfers based on the geographical origins of the multiple golf ball trajectories.

2. A system as claimed in claim 1, wherein the processor is configured to assign each of the multiple golf ball trajectories to one of one or more golfers based on received geographical positions of the one or more golfers.

3. A system as claimed in claim 1, wherein the coverage area is a golf driving range.

4. A system as claimed in claim 1, wherein the processor is further configured to receive positions of dedicated targets placed within the coverage area.

5. A system as claimed in claim 4, wherein the processor is further configured to determine how far from a specified dedicated target each of the multiple golf balls landed.

6. A system as claimed in claim 1, wherein the radar sensors measure at least a distance and a relative radial speed between a ball and a radar sensor.

7. A system as claimed in claim 1, wherein multilateration techniques are used to determine the locations of the multiple golf balls moving through the coverage area.

8. A system as claimed in claim 1, wherein dedicated ID tags in conjunction with radar or Global Navigation Satellite System (GNSS) are used to determine the locations of the golfers and/or dedicated targets.

9. A system as claimed in claim 1, further comprising a communications interface for enabling users to log on to the system from user devices and access information of golf ball trajectories assigned to them.

10. A system as claimed in claim 9, further comprising a mobile device application operable on a user device and configured to provide at least one of games and training aids to the users utilising data received or determined by the system.

11. A system as claimed in claim 1, which is adapted to serve as a tool for coaches to manage their players' training programmes and track improvement.

12. A system as claimed in claim 1, wherein session data relating to golf ball trajectories assigned to golfers over a predefined period is uploaded to cloud-based storage facilities from where the session data is accessible via a desktop, mobile or web-based application for subsequent viewing and analysis.

13. A method for tracking a golf ball, the method being conducted utilising a distributed radar sensor system including a plurality of radar sensors distributed over a coverage area and a processor comprising hardware in communication via a communication link with the radar sensors and the method comprising:
measuring data of multiple golf balls simultaneously moving through the coverage area;
tracking flights of the multiple golf balls by associating subsequent measurements from particular balls in flight based on continuity of data from one sample to a next sample;
concurrently constructing complete trajectories for each of the multiple golf balls in flight and determining their geographical origins and landing locations; and
assigning each of the multiple golf ball trajectories to one of one or more golfers based the geographical origins of the multiple golf ball trajectories.

14. A method as claimed in claim 13, wherein assigning each of the multiple golf ball trajectories to one of one or more golfers comprises receiving the geographical positions of the one or more golfers.

15. A method as claimed in claim 13, wherein the coverage area is a golf driving range.

16. A method as claimed in claim 13, further comprising receiving positions of dedicated targets placed within the coverage area.

17. A method as claimed in claim 16, further comprising determining how far from a specified dedicated target each of the multiple golf balls landed.

18. A method as claimed in claim 13, wherein multilateration techniques are used to determine the locations of the multiple golf balls moving through the coverage area.

19. A method as claimed in claim 13, further comprising uploading session data relating to golf ball trajectories assigned to golfers over a predefined period to cloud-based storage facilities from where the session data is accessible via a desktop, mobile or web-based application for subsequent viewing and analysis.

20. A system for tracking multiple balls in flight simultaneously, comprising:
a plurality of radar sensors distributed over a coverage area;
a processor comprising hardware configured to:
receive data from the plurality of radar sensors;
assign indexes to radar measurements from particular balls in flight based on continuity of range and speed data from one sample to a next sample,
construct complete trajectories for each of a plurality of balls in flight by using the data received from the plurality of radar sensors and the assigned indexes;
determine a physical location of each ball's trajectory origin; and
provide ball flight data to a device associated with a ball's trajectory origin.

21. The system as claimed in claim 20, wherein the device at a ball's trajectory origin includes a screen displaying the ball flight data.

22. The system as claimed in claim 20, wherein the processor receives time-stamped measured data from each of the plurality of radar sensors, and calculates from the time-stamped measured data ball flight data including position and speed values for each ball in flight.

23. The system as claimed in claim 20, wherein the processor is configured, for each ball trajectory, to compare the trajectory origin with known launch locations to assign a launch location to a trajectory.

24. The system as claimed in claim 23, wherein the known launch locations are fixed hitting bays.

25. The system as claimed in claim 20, wherein the processor is configured to combine range and speed data to construct a complete flight trajectory for each of the plurality of balls tracked all the way back to the trajectory origin from where the ball was launched.

26. The system as claimed in claim 20, wherein the plurality of radar sensors includes at least three radar sensors distributed over the coverage area.

27. The system as claimed in claim 26, wherein the plurality of radar sensors are positioned to ensure no blind spots whilst minimizing a total number of sensors required for the coverage area.

28. The system as claimed in claim 20, wherein the processor is configured to receive position data from the device associated with a user and to identify a location of the user as a known launch location.

29. The system as claimed in claim 28, wherein the position data is Global Navigation Satellite System data associated with the device.

30. The system as claimed in claim 20, wherein the processor is configured to identify as known launch locations each of a plurality of known user locations of users logged in as users of the system.

31. The system as claimed in claim 20, wherein one of the plurality of radar sensors transmits continuously and measures at least the relative radial speed (Doppler) between the ball and the sensor.

32. The system as claimed in claim 20, wherein the processor is configured to combine range and speed data from the plurality of radar sensors to construct complete three-dimensional flight trajectories using multilateration and tracking techniques.

* * * * *